United States Patent
Leach et al.

(10) Patent No.: US 8,992,226 B1
(45) Date of Patent: Mar. 31, 2015

(54) UNICOUPON FOR VIRTUAL REALITY WELDING SIMULATOR

(71) Applicant: Lincoln Global, Inc., City of Industry, CA (US)

(72) Inventors: Jason Leach, Cleveland Heights, OH (US); Antonius Aditjandra, Chardon, OH (US); Deanna Postlethwaite, Chagrin Falls, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 14/331,402

(22) Filed: Jul. 15, 2014

(51) Int. Cl.
| | |
|---|---|
| *G09B 19/00* | (2006.01) |
| *G09B 25/02* | (2006.01) |
| *G09B 19/24* | (2006.01) |
| *G09B 25/00* | (2006.01) |
| *B23K 9/00* | (2006.01) |
| *B23K 9/28* | (2006.01) |
| *B23K 9/32* | (2006.01) |
| *B23K 35/00* | (2006.01) |
| *B23K 35/02* | (2006.01) |

(52) U.S. Cl.
CPC ........................................ *G09B 19/24* (2013.01)
USPC .......... 434/234; 434/219; 434/260; 219/59.1; 219/60 R; 219/136; 219/137 R; 219/137 PS; 219/137 WM; 219/137.2; 219/137.31; 219/137.41; 219/137.42; 219/137.43; 219/137.44; 219/137.51; 219/137.52; 219/137.61; 219/137.62; 219/137.63; 219/137.7; 219/137.71; 219/137.8; 219/137.9

(58) Field of Classification Search
USPC ....................... 434/234, 260; 219/59.1, 60 R, 219/136–137.9
See application file for complete search history.

(56) References Cited

U.S. PATENT DOCUMENTS

| | | | | |
|---|---|---|---|---|
| 1,981,850 | A | * | 11/1934 | Fisher ........................ 228/173.2 |
| 3,866,011 | A | * | 2/1975 | Cole ................................ 219/72 |
| 3,867,769 | A | * | 2/1975 | Schow et al. ................. 434/234 |
| 3,904,845 | A | * | 9/1975 | Minkiewicz .................. 228/176 |
| 4,124,944 | A | * | 11/1978 | Blair ............................. 434/234 |
| 4,132,014 | A | * | 1/1979 | Schow .......................... 434/234 |
| 4,452,589 | A | * | 6/1984 | Denison ........................ 434/234 |
| 4,677,277 | A | * | 6/1987 | Cook et al. ............... 219/130.01 |
| 4,680,014 | A | * | 7/1987 | Paton et al. ................... 434/234 |
| 4,689,021 | A | * | 8/1987 | Vasiliev et al. ............... 434/234 |

(Continued)

FOREIGN PATENT DOCUMENTS

WO     2013/186413 A1     12/2013

OTHER PUBLICATIONS

"A New Kind of Welding Trainer—Soldamatic Augmented Reality" Welding Learning Labs, Inc., www.LLI.com accessed on Apr. 10, 2014.

*Primary Examiner* — Nikolai A Gishnock
(74) *Attorney, Agent, or Firm* — Pearne & Gordon LLP

(57) ABSTRACT

A mock welding unicoupon for a virtual welding system includes a first exterior surface and a second exterior surface perpendicular to the first exterior surface. The first exterior surface and the second exterior surface together provide a plurality of grooves configured for simulation of a plurality of different types groove welds on the mock welding unicoupon. A curved exterior surface is configured for simulation of a pipe fillet weld on the mock welding unicoupon. A magnet source is configured to generate a magnetic field around the mock welding unicoupon for tracking movements of a mock welding tool with respect to the mock welding unicoupon.

19 Claims, 9 Drawing Sheets

(56) References Cited

U.S. PATENT DOCUMENTS

| | | | |
|---|---|---|---|
| 4,716,273 A * | 12/1987 | Paton et al. | 219/130.1 |
| 4,867,685 A * | 9/1989 | Brush et al. | 434/234 |
| 4,897,521 A * | 1/1990 | Burr | 219/124.03 |
| 4,931,018 A * | 6/1990 | Herbst et al. | 434/234 |
| 5,708,253 A * | 1/1998 | Bloch et al. | 219/130.01 |
| 5,823,785 A * | 10/1998 | Matherne, Jr. | 434/234 |
| 5,845,053 A * | 12/1998 | Watanabe et al. | 700/262 |
| 6,051,805 A * | 4/2000 | Vaidya et al. | 219/130.01 |
| 6,750,428 B2 * | 6/2004 | Okamoto et al. | 219/130.5 |
| 7,087,853 B2 * | 8/2006 | Holte et al. | 219/75 |
| D614,217 S * | 4/2010 | Peters et al. | D15/144 |
| D615,573 S * | 5/2010 | Peters et al. | D15/144 |
| D631,074 S * | 1/2011 | Peters et al. | D15/144 |
| 8,248,324 B2 * | 8/2012 | Nangle | 345/8 |
| 8,274,013 B2 * | 9/2012 | Wallace | 219/137 R |
| 8,316,462 B2 * | 11/2012 | Becker et al. | 2/8.1 |
| 8,657,605 B2 * | 2/2014 | Wallace et al. | 434/219 |
| 8,747,116 B2 * | 6/2014 | Zboray et al. | 434/260 |
| 8,834,168 B2 * | 9/2014 | Peters et al. | 434/219 |
| 2003/0172032 A1 * | 9/2003 | Choquet | 705/51 |
| 2005/0128186 A1 * | 6/2005 | Shahoian et al. | 345/161 |
| 2006/0136183 A1 * | 6/2006 | Choquet | 703/11 |
| 2008/0038702 A1 * | 2/2008 | Choquet | 434/260 |
| 2008/0078812 A1 * | 4/2008 | Peters et al. | 228/101 |
| 2008/0314887 A1 * | 12/2008 | Stoger et al. | 219/137 R |
| 2009/0231423 A1 * | 9/2009 | Becker et al. | 348/82 |
| 2009/0298024 A1 * | 12/2009 | Batzler et al. | 434/234 |
| 2010/0048273 A1 * | 2/2010 | Wallace et al. | 463/7 |
| 2010/0062405 A1 * | 3/2010 | Zboray et al. | 434/234 |
| 2010/0062406 A1 * | 3/2010 | Zboray et al. | 434/234 |
| 2010/0224610 A1 * | 9/2010 | Wallace | 219/137 R |
| 2011/0091846 A1 * | 4/2011 | Kreindl et al. | 434/234 |
| 2011/0117527 A1 * | 5/2011 | Conrardy et al. | 434/234 |
| 2011/0183304 A1 | 7/2011 | Wallace | |
| 2012/0189993 A1 | 7/2012 | Kindig | |
| 2013/0040270 A1 * | 2/2013 | Albrecht | 434/234 |
| 2013/0183645 A1 | 7/2013 | Wallace | |
| 2013/0189657 A1 | 7/2013 | Wallace | |
| 2013/0189658 A1 * | 7/2013 | Peters et al. | 434/234 |
| 2013/0196296 A1 * | 8/2013 | Peters et al. | 434/234 |
| 2013/0209976 A1 * | 8/2013 | Postlethwaite et al. | 434/234 |
| 2013/0230832 A1 * | 9/2013 | Peters et al. | 434/234 |
| 2014/0017642 A1 * | 1/2014 | Postlethwaite et al. | 434/234 |
| 2014/0065584 A1 * | 3/2014 | Wallace et al. | 434/234 |
| 2014/0205976 A1 * | 7/2014 | Peters et al. | 434/234 |
| 2014/0220522 A1 * | 8/2014 | Peters et al. | 434/234 |
| 2014/0234813 A1 * | 8/2014 | Peters et al. | 434/234 |
| 2014/0322684 A1 * | 10/2014 | Wallace et al. | 434/234 |

* cited by examiner

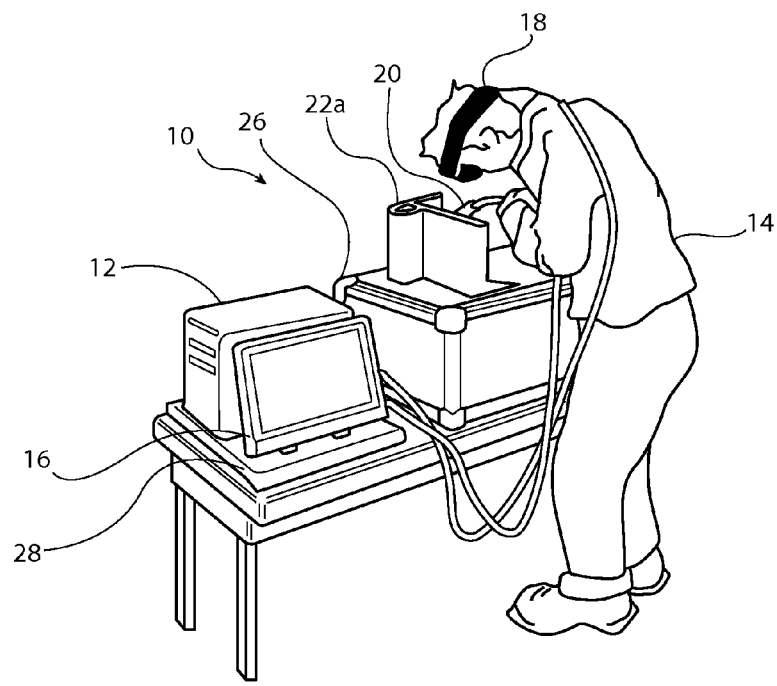
FIG. 1
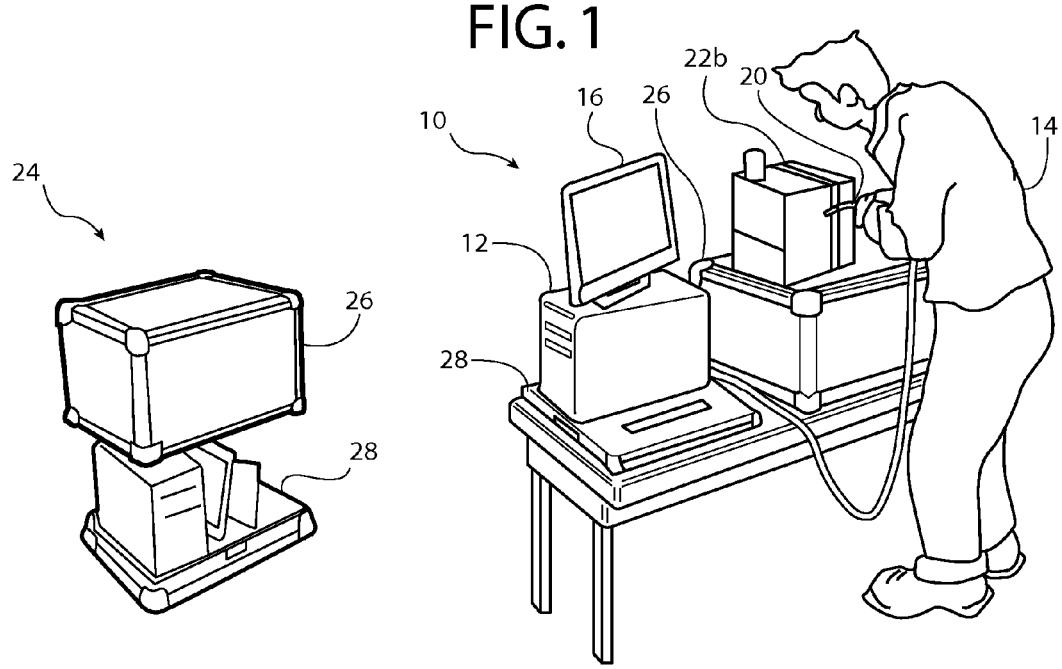
FIG. 3
FIG. 2

# UNICOUPON FOR VIRTUAL REALITY WELDING SIMULATOR

BACKGROUND

1. Field of the Disclosure

The present disclosure relates to systems for simulating welding in a virtual welding environment and to welding coupons for use with such systems.

2. Description of Related Art

For decades companies have been teaching welding skills. Traditionally, welding has been taught in a real world setting, that is to say that welding has been taught by actually striking an arc with an electrode on a piece of metal. Instructors, skilled in the art, oversee the training process making corrections in some cases as the trainee performs a weld. By instruction and repetition, a new trainee learns how to weld using one or more processes. However, costs are incurred with every weld performed, which varies depending on the welding process being taught.

In more recent times, cost saving systems for training welders have been employed. Some systems incorporate a motion analyzer. The analyzer includes a physical model of a weldment, a mock electrode and sensing means that track movement of the mock electrode. A report is generated that indicates to what extent the electrode tip traveled outside an acceptable range of motion. More advanced systems incorporate the use of virtual reality, which simulates manipulation of a mock electrode and the resulting welds in a virtual setting that can be observed (e.g., visually, audibly, etc.) in real time by the welder.

Virtual reality welding simulators typically include a number of different physical models of weldments (e.g., mock welding coupons), wherein each physical model allows the welder to practice a certain type of weld. For example, one mock welding coupon might have two perpendicular surfaces that allow the welder to practice a fillet weld, while another mock welding coupon might have a grooved surface that allows the welder to practice a groove weld. To switch between different types of simulated welds, the welder must reposition or replace the mock welding coupon. Not only is it inconvenient to the welder to interrupt training to reposition or replace the mock welding coupon, but repositioning or replacing the mock welding coupon can lead to the welding coupon being mounted improperly. For example, if the virtual reality welding simulator is programmed to expect the mock welding coupon to be located in a certain fixed location, and the welder mounts the welding coupon in another, improper location, incorrect simulated welding data will result.

BRIEF SUMMARY

The following summary presents a simplified summary in order to provide a basic understanding of some aspects of the devices and systems discussed herein. This summary is not an extensive overview of the devices and systems discussed herein. It is not intended to identify critical elements or to delineate the scope of such devices and systems. Its sole purpose is to present some concepts in a simplified form as a prelude to the more detailed description that is presented later.

In accordance with one aspect, provided is a mock welding unicoupon for a virtual welding system. The mock welding unicoupon includes a first exterior surface and a second exterior surface perpendicular to the first exterior surface. The first exterior surface and the second exterior surface together provide a plurality of grooves configured for simulation of a plurality of different types of groove welds on the mock welding unicoupon. A curved exterior surface is configured for simulation of a pipe fillet weld on the mock welding unicoupon. A magnet source is configured to generate a magnetic field around the mock welding unicoupon for tracking movements of a mock welding tool with respect to the mock welding unicoupon.

In accordance with another aspect, provided is a virtual welding system. The virtual welding system includes a mock welding tool for performing simulated welds. A mock welding unicoupon is configured for receiving a plurality of different types of simulated welds using the mock welding tool. The mock welding unicoupon includes at least one grooved vertical surface, at least one grooved horizontal surface, and at least one curved surface. The plurality of different types of simulated welds include a pipe fillet weld, a vertical groove weld, a horizontal groove weld or a flat groove weld, and a horizontal fillet weld. A programmable processor based subsystem is operable to execute coded instructions for generating an interactive virtual reality welding environment that simulates welding activity on a virtual welding unicoupon corresponding to the mock welding unicoupon. The interactive virtual reality welding environment includes a virtual weld puddle on the virtual welding unicoupon generated in real time in response to the simulated welds on the mock welding unicoupon. A display device is operatively connected to the programmable processor based subsystem and is configured to visually depict the interactive virtual reality welding environment, including the virtual weld puddle on the virtual welding unicoupon, in real time.

In accordance with another aspect, provided is a virtual welding system. The virtual welding system includes a mock welding tool for performing simulated welds. The mock welding tool includes a magnetic field sensor. A mock welding unicoupon is configured for receiving a plurality of different types of simulated welds using the mock welding tool. The mock welding unicoupon includes a magnet source configured to generate a magnetic field around the mock welding unicoupon for tracking movements of the mock welding tool with respect to the mock welding unicoupon. The mock welding unicoupon further comprises at least one grooved vertical surface, at least one grooved horizontal surface, and at least one curved surface. The plurality of different types of simulated welds include a pipe fillet weld, a vertical groove weld, a horizontal groove weld, a flat groove weld, a horizontal fillet weld, and a pipe groove weld or an overhead fillet weld. A programmable processor based subsystem is operable to execute coded instructions for generating an interactive virtual reality welding environment that simulates welding activity on a virtual welding unicoupon corresponding to the mock welding unicoupon. The interactive virtual reality welding environment includes a virtual weld puddle on the virtual welding unicoupon generated in real time in response to the simulated welds on the mock welding unicoupon. The virtual weld puddle includes dynamic real time molten metal fluidity and heat dissipation characteristics. A display device is operatively connected to the programmable processor based subsystem and is configured to visually depict the interactive virtual reality welding environment, including the virtual weld puddle on the virtual welding unicoupon, in real time.

BRIEF DESCRIPTION OF THE DRAWINGS

FIG. 1 is a perspective view of a welder using a virtual welding system;

FIG. 2 is a perspective view of a welder using a virtual welding system;

FIG. 3 is a perspective view of a virtual welding system;

DETAILED DESCRIPTION

Figure 4:
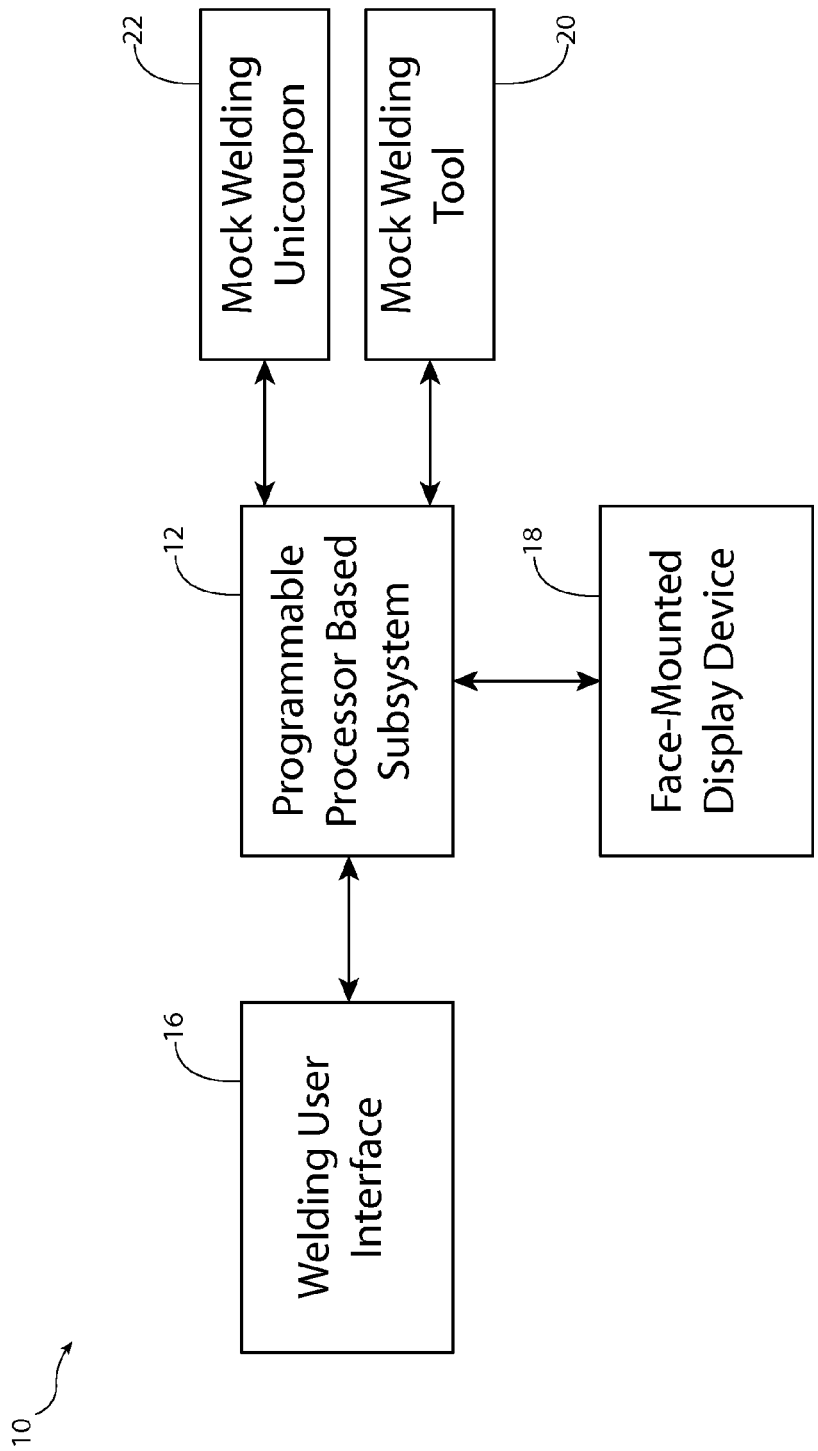
FIG. 4 is a schematic block diagram of a virtual welding system.
Figure 5:
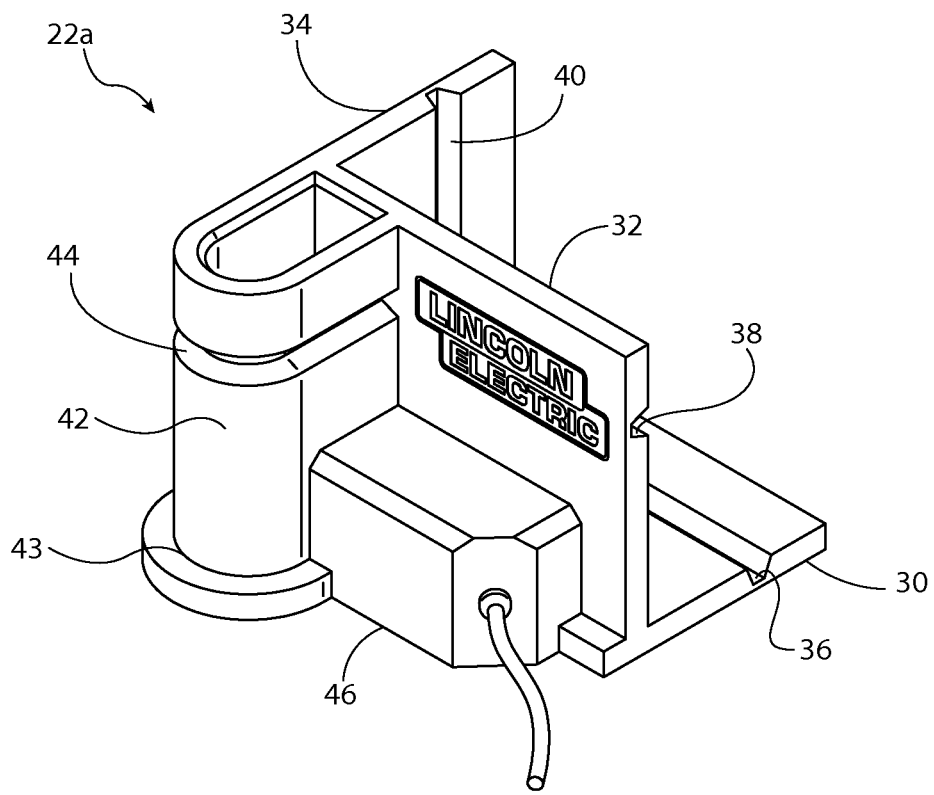
FIG. 5 is a perspective view of a mock welding unicoupon.
Figure 6:
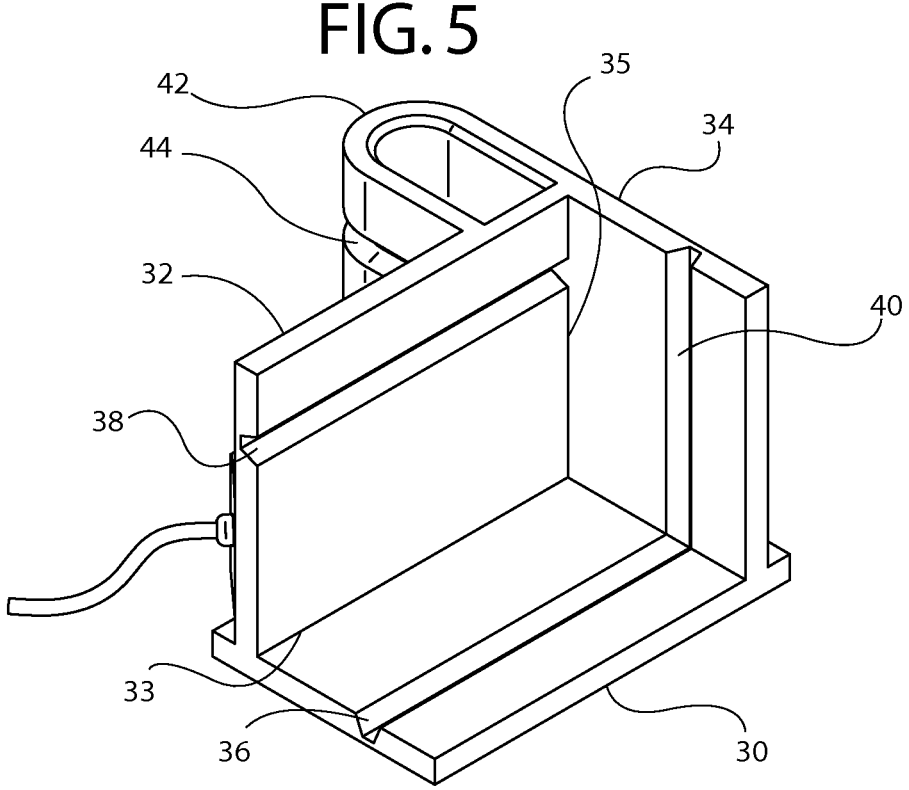
FIG. 6 is a perspective view of a mock welding unicoupon.
Figure 7:
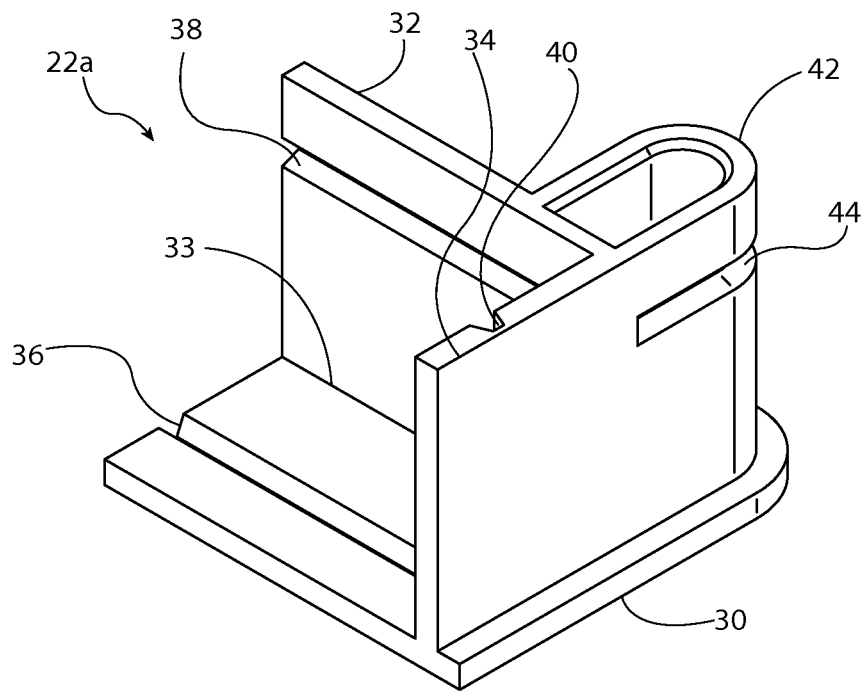
FIG. 7 is a perspective view of a mock welding unicoupon.
Figure 8:
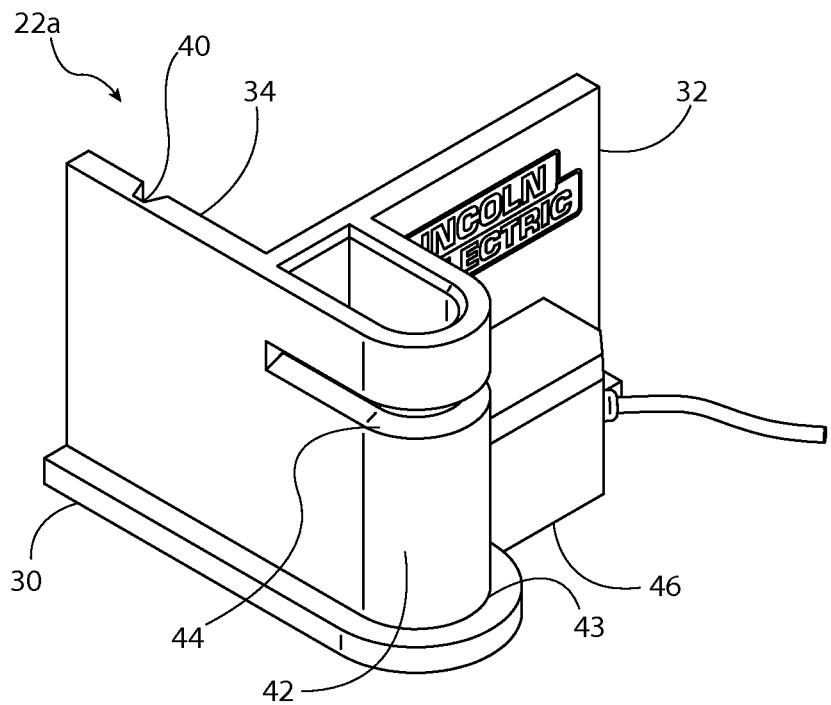
FIG. 8 is a perspective view of a mock welding unicoupon.
Figure 9:
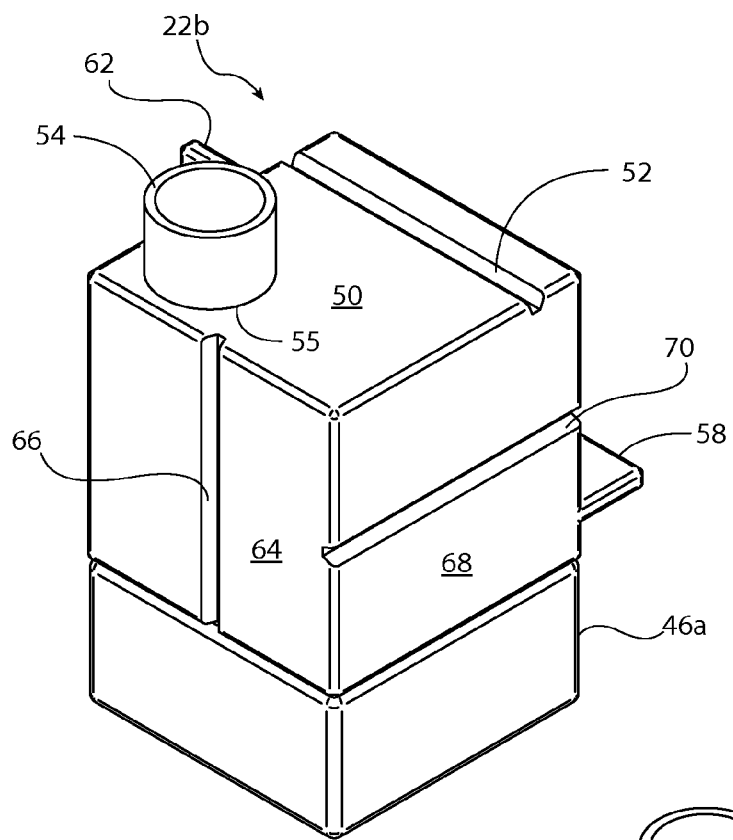
FIG. 9 is a perspective view of a mock welding unicoupon.
Figure 10:
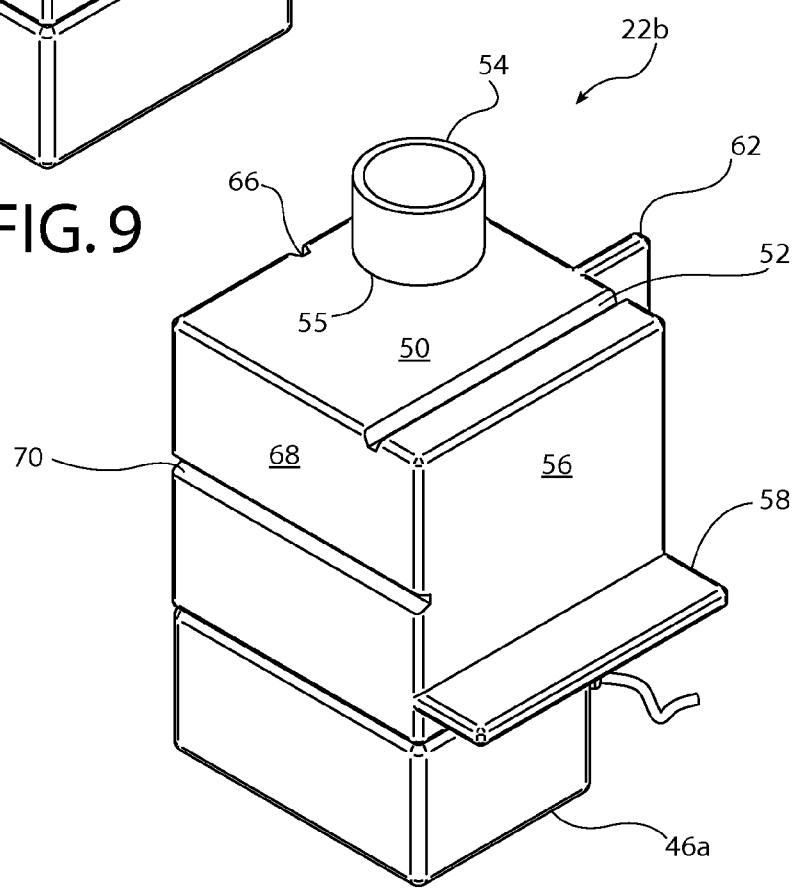
FIG. 10 is a perspective view of a mock welding unicoupon.
Figure 11:
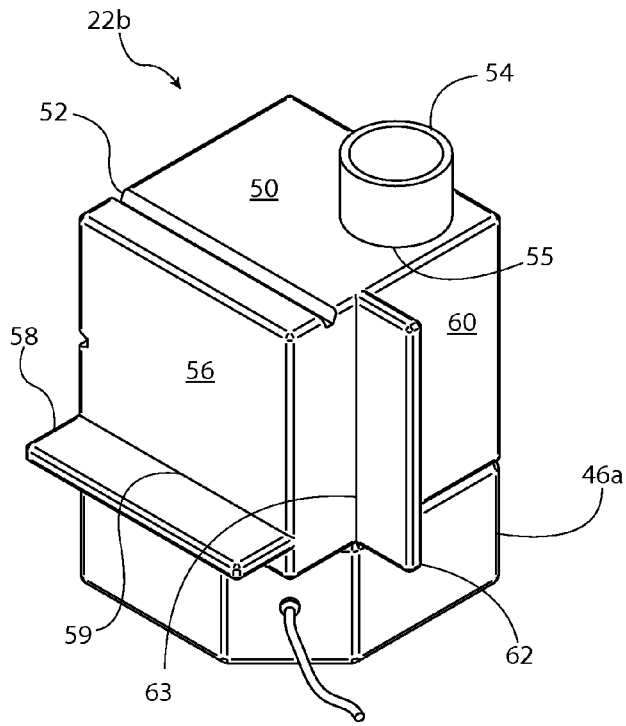
FIG. 11 is a perspective view of a mock welding unicoupon.
Figure 12:
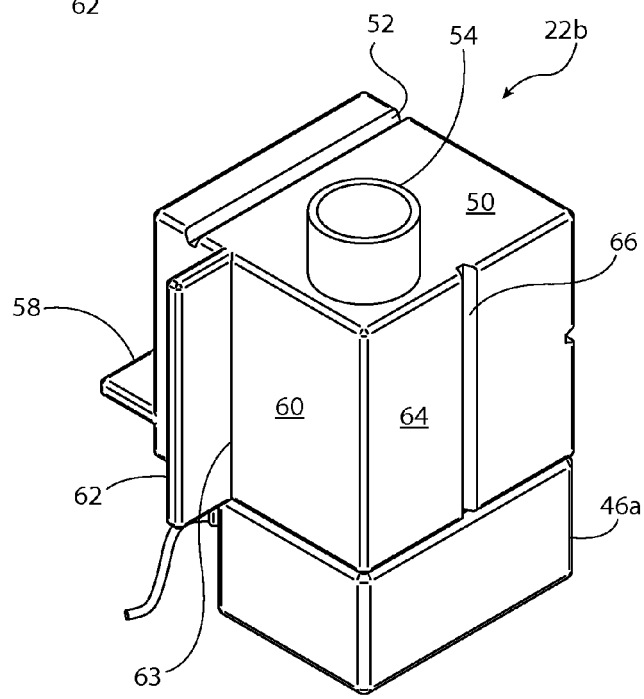
FIG. 12 is a perspective view of a mock welding unicoupon.
Figure 13:
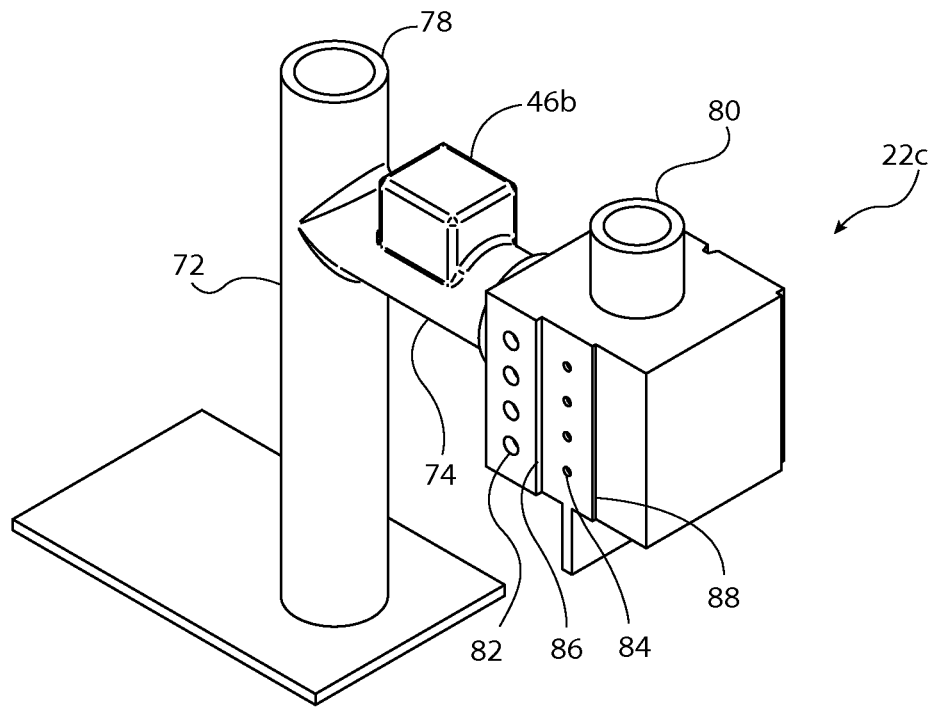
FIG. 13 is a perspective view of a mock welding unicoupon.

The present subject matter is directed to virtual welding systems for use in training or demonstrating welding operations, and directed to mock welding coupons for use in such systems. Details of virtual welding systems can be found in U.S. Patent Application Publication No. 2012/0189993 A1 (Kindig et al.), titled VIRTUAL WELDING SYSTEM, published on Jul. 26, 2012, which is incorporated herein by reference in its entirety, and in U.S. Patent Application Publication No. 2013/1089657 A1 (Wallace et al.), titled VIRTUAL REALITY GTAW AND PIPE WELDING SIMULATOR AND SETUP, published Jul. 25, 2013, which is incorporated herein by reference in its entirety.

The present subject matter will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present subject matter. It may be evident, however, that the present subject matter can be practiced without these specific details. Additionally, other embodiments of the subject matter are possible and the subject matter is capable of being practiced and carried out in ways other than as described. The terminology and phraseology used in describing the subject matter is employed for the purpose of promoting an understanding of the subject matter and should not be taken as limiting.

FIGS. 1-3 show components of a virtual welding system, and FIG. 4 provides a block diagram of the virtual welding system 10. The virtual welding system includes a programmable processor based subsystem 12 that generates an interactive virtual reality welding environment for providing training to a welder or user 14 on different welding techniques and processes. The programmable processor based subsystem 12 can simulate different welding processes, such as gas metal arc welding (GMAW), shielded metal arc welding (SMAW), gas tungsten arc welding (GTAW) and the like in a virtual reality space and provide real time feedback to the user 14 regarding the progress and quality of the simulated welds. The programmable processor based subsystem 12 can include one or more processors (e.g., microprocessor, microcontroller, etc.) and associated memory (RAM, ROM, etc.) for storing and executing coded program instructions that cause the programmable processor based subsystem to provide the functionality ascribed to it herein.

The virtual welding system 10 includes a welding user interface 16 that communicates with the programmable processor based subsystem. The welding user interface 16 allows the user 14 to set up a welding process to be simulated. The welding user interface 16 can include input and output devices, such as video displays, keyboards, mice, joysticks, touchscreens, etc. Through the welding user interface 16, the user 14 can select or set various virtual or simulated welding parameters, such as welding voltage, welding current, welding polarity, welding waveforms, wire feed speed, etc. Real time feedback of a virtual welding operation can be provided to the user 14 through the welding user interface 16. For example, welding progress including depictions of weld quality, defects, and the weld puddle can be displayed to the user 14 on the welding user interface 16 in real time. Real time audible feedback of the virtual welding operation can also be provided to the user 14 through the welding user interface 16. Thus, the user's 14 simulated welding activity in the real world is translated into virtual welding activity and output in real-time. As used herein, the term "real-time" means perceiving and experiencing, in time, a virtual environment in substantially the same way that an end user 14 would perceive and experience, in time, in a real-world setting.

Real time feedback of the virtual welding operation can also be provided to the user through a face-mounted display device 18. The face mounted display device 18 can be integrated into a welding helmet, or alternatively may be separately mounted as shown in FIG. 1. The face mounted display device 18 can include two high-contrast micro-displays capable of delivering fluid full-motion video in the 2D and frame sequential video modes. Virtual images, e.g. video, from the virtual welding environment are provided and displayed on the face mounted display device 18. A zoom mode may also be provided, allowing user 14 to simulate a cheater plate. The face mounted display device 18 can further include speakers, allowing the user 14 to hear simulated welding-related and environmental sounds. The face mounted display device 18 operatively connects to the programmable processor based subsystem 12 via wired or wireless means.

During training, the user 14 performs simulated welding using a mock welding tool 20. The mock welding tool 20 may be fashioned to resemble a real-world welding tool, like, for example, a manual welding electrode holder or an arc welding torch. The mock welding tool 20 can have the same shape, weight and/or feel as a real-world welding tool. The mock welding tool 20 operatively connects to the programmable processor based subsystem 12 via wired or wireless means.

Using the mock welding tool 20, the user 14 performs simulated welds on a mock welding coupon, such as a mock welding unicoupon 22, 22a, 22b. As will described in detail below, the mock welding unicoupon 22, 22a, 22b is structurally configured to receive a plurality of different types of simulated welds using the mock welding tool 20. Conventional mock welding coupons are configured to receive one type of simulated weld, such as a horizontal fillet weld. Conversely, the mock welding unicoupons discussed herein are configured to receive several different types of simulated welds. Conventional mock welding coupons also have to be correctly positioned with respect to elements of a spatial tracking system, if the virtual welding system is to operate properly. Certain mock welding unicoupons 22, 22a, 22b discussed herein have elements of the spatial tracking system built into them in a fixed positional relationship with respect to the unicoupon, so that the unicoupon is inherently correctly positioned.

As shown in FIG. 1-3, the virtual welding system 10 can include an enclosure 24 for storing and transporting the components of the virtual welding system. The enclosure 24 includes a lid 26 and a base 28. When the virtual welding system 10 is in use, the lid 26 of the enclosure 24 can be used as a stand for supporting the mock welding unicoupon during simulated welding, while other components of the system, such as the programmable processor based subsystem or the welding user interface, remain on the base 28.

Turning to FIGS. 5-8, one example mock welding unicoupon 22a is shown from several different perspectives. The mock welding unicoupon 22a allows a plurality of different welds to be simulated using the mock welding tool. The mock welding unicoupon 22a includes a base 30 and first 32 and second 34 wall members that are perpendicular to the base and to each other. The base 30 and first 32 and second 34 wall members provide exterior surfaces of the mock welding unicoupon upon which simulating welding can occur. For example, a simulated linear fillet weld, such as a simulated horizontal fillet weld (e.g., welding position 2F) can be performed along the intersection 33 of the base 30 and the first wall member 32. A different type of simulated linear fillet weld, such as a simulated vertical fillet weld (e.g., welding position 3F) can be performed along the intersection 35 of the first 32 and second 34 wall members.

The base 30 and first 32 and second 34 wall members include respective grooves 36, 38, 40 for simulating various groove welds. The base 30 forms a grooved horizontal surface that allows a flat groove weld (e.g., welding position 1G) to be simulated using the mock welding tool. The first wall member 32 includes a horizontal groove 38 that allows a horizontal groove weld (e.g., welding position 2G) to be simulated. The second wall member 34 includes a vertical groove 40 that allows a vertical groove weld (e.g., welding position 3G) to be simulated. Thus, the grooved base 30 and first 32 and second 34 wall members allow at least five different types of welds to be simulated using the mock welding tool (two types of fillet welds and three types of groove welds). In certain embodiments, additional welding operations can be simulated using the mock welding unicoupon 22a, such as hardfacing. Additionally, in certain embodiments, the mock welding unicoupon 22a can be repositioned (e.g., turned upside down) to allow additional welding operations to be simulated, such as an overhead linear fillet weld (e.g., welding position 4F), an overhead groove weld (e.g., welding position 4G), a flat fillet weld (e.g., welding position 1F), etc.

The mock welding unicoupon 22a can include a curved surface 42 that allows various pipe welds to be simulated. The base 30 of the mock welding unicoupon 22a projects beyond the curved surface 42, which allows a pipe fillet weld to be simulated along the intersection 43 of the curved surface and the base. The curved surface includes a curved groove 44, which allows a pipe groove weld (e.g., welding position 2G) to be simulated. In certain embodiments, the mock welding unicoupon 22a can be repositioned to allow additional pipe welds to be simulated, such as the horizontal fixed (e.g., welding position 5G) or inclined (e.g., welding position 6G) welding positions.

The mock welding unicoupon 22a includes magnet source 46 that generates a magnetic envelope around the unicoupon, so that the position of the mock welding tool, and optionally the face-mounted display device, can be tracked. The mocking welding unicoupon 22a can be made of a material, such as plastic, that will not interfere with or substantially distort the magnetic envelope. The magnet source 46 is activated by the programmable processor based subsystem when simulated welding is to be performed. The magnetic envelope generated around the mock welding unicoupon 22a defines a three dimensional space within which user activity, such as movements of the mock welding tool and user head movements (e.g., viewing position) can be tracked.

The magnet source 46 is attached to the mock welding unicoupon 22a in a fixed position known to the programmable processor based subsystem, and the user does not have to manually correctly position the mock welding unicoupon with respect to the magnet source 46 as in previous virtual welding systems. In the embodiment of FIGS. 5-8, the magnet source 46 is attached to exterior surfaces of the mock welding unicoupon 22a. Alternatively, the mock welding unicoupon can form an enclosure for the magnet source 46, and the magnet source can be located inside of the mock welding unicoupon. In certain embodiments, the magnet source 46 can include one or more position sensors for determining the orientation of the mock welding unicoupon 22a. The orientation of the mock welding unicoupon 22a can be transmitted to the programmable processor based subsystem, so that the programmable processor based subsystem knows the orientation of the mock welding unicoupon 22a and what welds are being simulated. For example, based on the orientation of the mock welding unicoupon 22a, the programmable processor based subsystem can distinguish between a horizontal fillet weld and an overhead fillet weld being simulated at the intersection of two surfaces (e.g., at the intersection 33 of the base 30 and the first wall member 32).

The mock welding tool and the face-mounted display device can include sensors that react to the magnetic field generated by the magnet source 46, and can send corresponding relative position information to the programmable processor based subsystem. The sensors can include multiple induction coils aligned in crossing spatial directions, which may be substantially orthogonally aligned. The induction coils measure the strength of the magnetic field in each of the three directions and, thus, can generate position information that is provided to the programmable processor based subsystem. The programmable processor based subsystem can include appropriate electronics, which may be in the form of a stand-alone module, for activating and controlling the magnet source 46 and receiving/interpreting position information from the position sensors in the mock welding tool and the face-mounted display device.

The programmable processor based subsystem can simulate the various surfaces of the mock welding unicoupon 22a in virtual reality space, and track the user's real world movements and translate them into corresponding movements in the virtual reality space. This interactive virtual reality welding environment can be displayed to the user in accordance with the user's actual physical viewing perspective.

Turning to FIGS. 9-12, another embodiment of a mock welding unicoupon 22b is shown. In the embodiment of the mock welding unicoupon 22b shown in FIGS. 9-12, the mock welding unicoupon is located atop the magnet source 46a, which provides a base for the mock welding unicoupon. The mock welding unicoupon 22b is generally cuboid in shape, with the various exterior surfaces having grooves or projecting portions that allow different types of welds to be simulated.

The upper surface 50 of the mock welding unicoupon 22b has a horizontal groove 52 and an upwardly-projecting cylindrical portion 54. The horizontal groove 52 allows a flat groove weld (e.g., welding position 1G) to be simulated using the mock welding tool. The cylindrical portion 54 allows a pipe fillet weld to be simulated along the intersection 55 of the cylindrical portion and the upper surface 50. The cylindrical portion 54 could include a circumferential groove (not shown) for allowing a pipe groove weld (e.g., welding position 2G) to be simulated.

A first vertical surface 56 of the mock welding unicoupon 22b can include a horizontal tab 58 that projects outward from the first vertical surface. A simulated horizontal fillet weld (e.g., welding position 2F) can be performed along the intersection 59 of the upper surface of the horizontal tab 58 and the first vertical surface 56. A simulated overhead fillet weld (e.g., welding position 4F) can be performed along the intersection the lower surface of the horizontal tab 58 and the first vertical surface.

A second vertical surface 60 of the mock welding unicoupon 22b can include a vertical tab 62 that projects outward from the second vertical surface. Simulated vertical fillet welds (e.g., welding position 3F) can be performed along the intersections 63 of the vertical tab 62 and the second vertical surface, on either side of the vertical tab 62.

A third vertical surface 64 of the mock welding unicoupon 22b can include a vertical groove 66 that allows a vertical groove weld (e.g., weld position 3G) to be simulated.

A fourth vertical surface 68 of the mock welding unicoupon 22b can include a horizontal groove 70 that allows a horizontal groove weld (e.g., weld position 2G) to be simulated.

Thus, the mock welding unicoupon 22b is configured for simulation of a plurality of different types of welds (e.g., flat groove weld, vertical groove weld, horizontal groove weld, pipe fillet weld, horizontal fillet weld, and overhead fillet weld) using just one mock welding coupon. As discussed above, the magnet source 46a is attached to the mock welding unicoupon 22b in a fixed position known to the programmable processor based subsystem, and the user does not have to manually correctly position the mock welding unicoupon with respect to the magnet source. Further, the magnet source 46a is mounted at the bottom of the mock welding unicoupon 22b and acts as a base for the mock welding unicoupon. The vertical surfaces 56, 60, 64, 68 project upward from the magnet source 46a and are supported atop the magnet source when the unicoupon 22b is in use.

In certain embodiments, the mock welding unicoupon 22b includes multiple grooves and/or tabs on the same surface of the unicoupon, so that various different welds can be simulated using the same side of the mock welding unicoupon. For example, one vertical side of the mock welding unicoupon 22b can include both the horizontal 58 and vertical 62 tabs so that horizontal, vertical and overhead fillet welds can be simulated at a common side of the mock welding unicoupon.

Turning to FIGS. 13-16, still another embodiment of a mock welding unicoupon 22c is shown. The mock welding unicoupon 22c can include various cylindrical projections, tabs and grooves as discussed above for simulating a plurality of different welds using one mock welding unicoupon.

Figure 14:
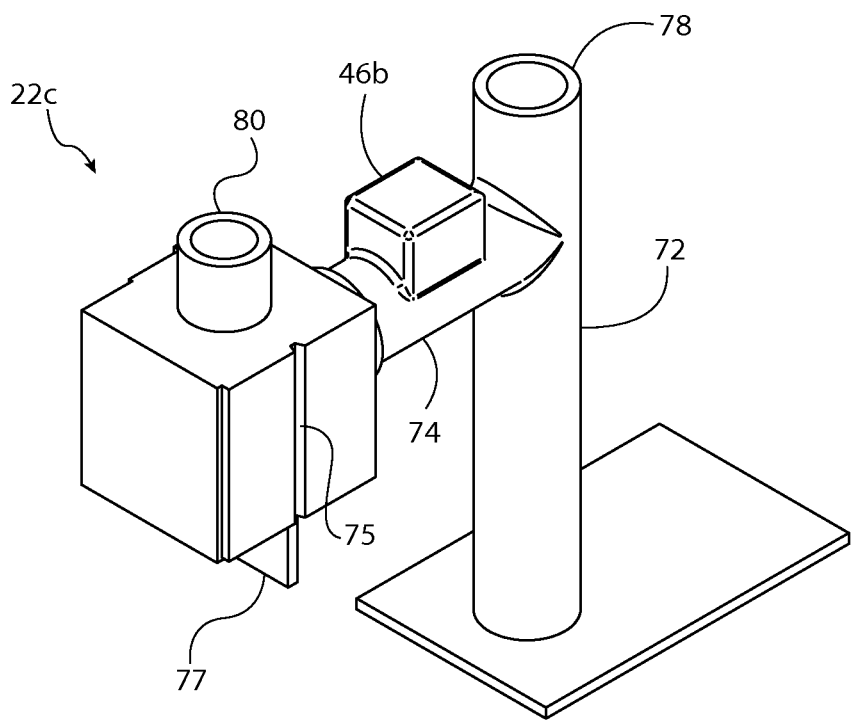
FIG. 14 is a perspective view of a mock welding unicoupon.
Figure 15:
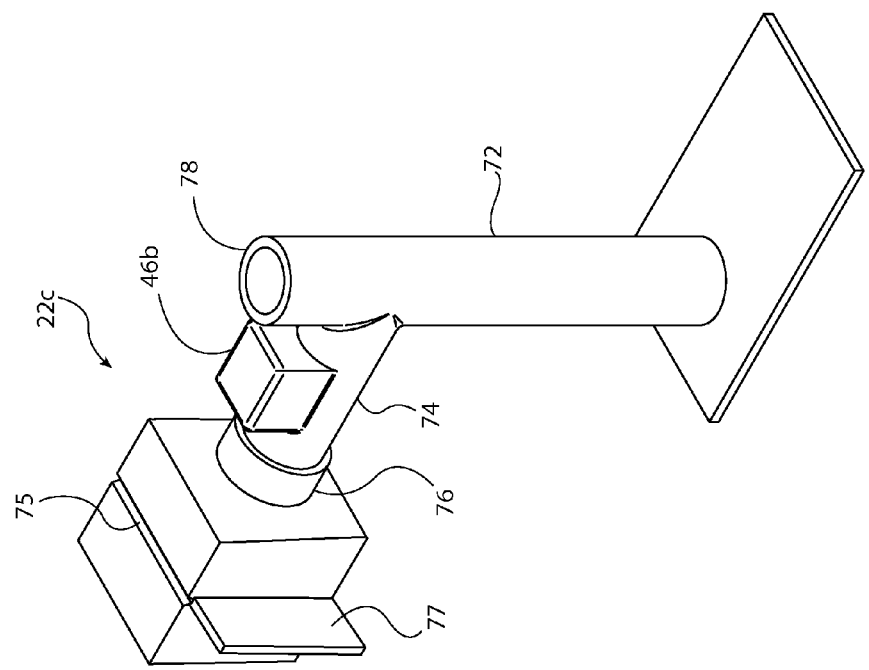
FIG. 15 is a perspective view of a mock welding unicoupon.

In the embodiment of the mock welding unicoupon 22c shown in FIGS. 13-16, the mock welding unicoupon is removably mounted to a stand 72. The stand includes an arm 74, and the mock welding unicoupon 22c includes a collar 76 that is slipped onto the end of the arm 74. The mock welding unicoupon 22c can include a fastener, such as set screw, to secure the unicoupon to the arm 74. In certain embodiments, the mock welding unicoupon 22c can be rotated on the arm 74, so that different welds can be simulated. For example, the mock welding unicoupon 22c can be rotated 45°, 90°, 180°, etc., which changes the orientation of the various welds that can be simulated. For example, the vertical groove 75 shown in FIG. 14 can be rotated into a horizontal position as shown in FIG. 15, so that both a vertical groove weld and a flat groove weld can be simulated using the same grooved surface. Similarly, the downwardly projecting tab 77 can allow overhead fillet welds to be simulated when the mock welding unicoupon 22c is positioned as shown in FIG. 14, and vertical fillet welds to be simulated when the mock welding unicoupon is positioned as shown in FIG. 15.

The collar 76 and arm 74 and stand 72 can be keyed to ensure that the mock welding unicoupon 22c is always correctly positioned on the stand/arm.

Figure 16:
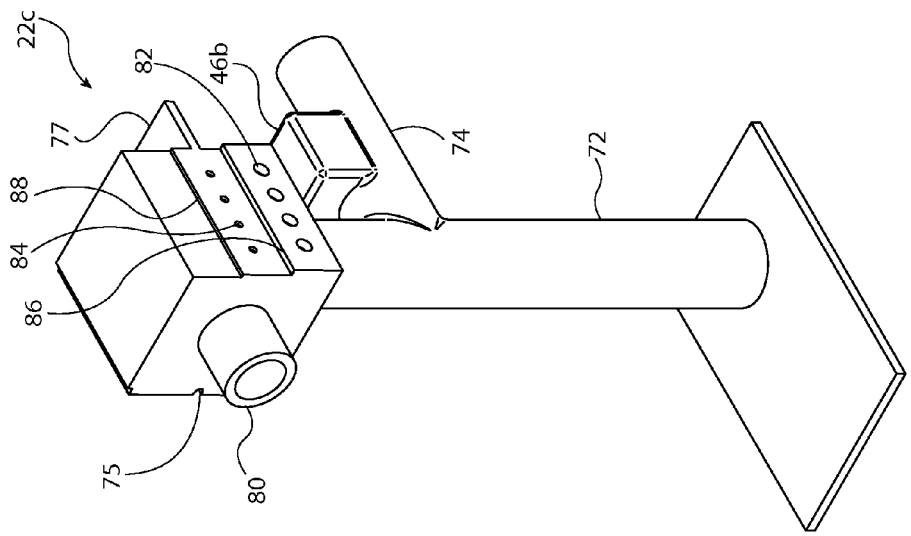
FIG. 16 is a perspective view of a mock welding unicoupon.

In certain embodiments, as shown in FIG. 16, the mock welding unicoupon 22c can be alternatively placed onto the top of the stand 72, to allow different types of welds to be simulated. That is, the mock welding unicoupon 22c can be removed from the arm 74, and the collar 76 slipped over the upper cylindrical end 78 of the stand 72, to reconfigure the unicoupon. Repositioning the mock welding unicoupon 22c turns the unicoupon 90°, which changes the orientation of various welds that can be simulated. For example, the mock welding unicoupon 22c can include a cylindrical projection 80 that is oriented upwards along a vertical axis when the unicoupon is mounted to the arm 74, and oriented sideways along a horizontal axis when the unicoupon is mounted to the end 78 of the stand. Different types of pipe welds can be simulated by repositioning the mock welding unicoupon 22c from the arm 74 to the end 78 of the stand. In a similar manner, different types of linear fillet welds can be simulated by reposition the mock welding unicoupon 22c from the arm 74 to the end 78 of the stand 72. For example, the downwardly projecting tab 77 in FIG. 14 can allow overhead fillet welds to be simulated when the mock welding unicoupon 22c is located on the arm 74. When the mock welding unicoupon 22c is moved to the end 78 of the stand 72 as shown in FIG. 16, the same tab will project horizontally, allowing a horizontal fillet weld to be simulated. Different types of groove welds can also be simulated by repositioning the mock welding unicoupon 22c from the arm 74 to the end 78 of the stand. For example, the vertical groove 75 shown in FIG. 14 can allow a vertical groove weld to be simulated when the mock welding unicoupon 22c is located on the arm 74. When the mock welding unicoupon 22c is moved to the end 78 of the stand 72 as shown in FIG. 16, the same groove will be oriented horizontally, allowing a horizontal groove weld to be simulated.

In addition to having grooves, projections, tabs, etc. for simulating different welds, the mock welding unicoupon 22c shown in FIGS. 13-16 further has holes 82, 84 of various diameter and stepped portions 86, 88. The holes 82, 84 allow plug welds to be simulated, whereas the stepped portions 86, 88 allow lap welds to be simulated. It is to be appreciated that the mock welding unicoupons 22a, 22b shown in FIGS. 5-12 could have similar holes and stepped portions if desired, to allow plug and lap welds to be simulated.

In the embodiment shown in FIGS. 13-16, the magnet source 46b is not directly attached to the mock welding unicoupon 22c. Rather, the magnet source 46b is attached to the stand 72 (e.g., attached to the arm 74) that supports the mock welding unicoupon 22c. The magnet source 46b can be configured to generate a magnetic envelope that is large enough to encompass the mock welding unicoupon 22c whether it is mounted to the arm 74 or the end 78 of the stand. Either the mock welding unicoupon 22c, the magnet source 46b or the stand 72 can be configured to inform the programmable processor based subsystem of the location of the unicoupon on the stand (i.e., whether the unicoupon is mounted on the arm 74 or the end 78 of the stand), via wired or wireless communications. For example, the unicoupon 22c or stand 72 can include limit switches or another type of sensor for identifying position of the unicoupon on the stand.

As discussed above with respect to FIG. 4, the virtual welding system 10 includes a programmable processor based subsystem 12 that is operable to execute coded instructions for generating the interactive virtual reality welding environment that simulates welding activity on a virtual reality welding unicoupon corresponding to the mock welding unicoupon. The interactive virtual reality welding environment includes a virtual weld puddle on the virtual welding unicoupon (corresponding to the mock welding unicoupon). The virtual weld puddle is generated by the programmable processor based subsystem 12 in real time in response to the user's simulated welds on the mock welding unicoupon based on the current welding parameters (e.g., voltage, current, waveforms, polarity, etc.) The interactive virtual reality welding environment generated by the programmable processor based subsystem 12, and the simulated results of the user's virtual welding activity, are displayed to the user and audibly reproduced via the welding user interface 16 and/or the face-mounted display device 18. The virtual welding system can simulate an actual welding operation by depicting the interactive virtual reality welding environment, including the virtual weld puddle on the virtual welding unicoupon, in real time.

The virtual weld puddle can include dynamic real time molten metal fluidity and heat absorption and dissipation characteristics that are displayed to the user during simulated welding. Bead and puddle visuals are driven by the state of a wexel (i.e., welding element) displacement map, which is discussed further below. To simulate a dynamic weld puddle and display its characteristics, the programmable processor based subsystem 12 can employ welding physics functionality or a physics model of the welding process and the mock welding unicoupon. The welding physics functionality employs a double displacement layer technique to accurately model dynamic fluidity/viscosity, solidity, heat gradient (heat absorption and dissipation), puddle wake, and bead shape.

The programmable processor based subsystem 12 can further employ bead rendering functionality to render a weld bead in all states from the heated molten state to the cooled solidified state. The bead rendering functionality uses information from the welding physics functionality (e.g., heat, fluidity, displacement, dime spacing) to accurately and realistically render a weld bead in virtual reality space in real-time.

Additional textures (e.g., scorching, slag, grain) can be overlaid onto the simulated weld bead, and various characteristics such as sparks, spatter, smoke, arc glow, fumes, and discontinuities such as undercut and porosity can be rendered and displayed to the user.

When simulating welds on the mock welding unicoupon, the user is able to view the weld puddle in virtual reality space and modify his welding technique in response to viewing the various characteristics of the simulated weld puddle, including real-time molten metal fluidity (e.g., viscosity) and heat dissipation. The user may also view and respond to other characteristics including real-time puddle wake and dime spacing. Viewing and responding to characteristics of the weld puddle is how many welding operations are actually performed in the real world. The double displacement layer modeling of the welding physics functionality allows for such real-time molten metal fluidity and heat dissipation characteristics to be accurately modeled and represented to the user. For example, heat dissipation determines solidification time (i.e., how much time it takes for a wexel to completely solidify).

Furthermore, the user may make a second pass over the weld bead material using the same or a different (e.g., a second) mock welding tool, welding electrode and/or welding process. In such a second pass scenario, the simulation shows the simulated mock welding tool, the mock welding unicoupon, and the original simulated weld bead material in virtual reality space as the simulated mock welding tool deposits a second simulated weld bead material merging with the first simulated weld bead material by forming a second simulated weld puddle in the vicinity of a simulated arc emitting from the simulated mock welding tool. Additional subsequent passes using the same or different welding tools or processes may be made in a similar manner. In any second or subsequent pass, the previous weld bead material is merged with the new weld bead material being deposited as a new weld puddle is formed in virtual reality space from the combination of any of the previous weld bead material, the new weld bead material, and possibly the underlying unicoupon material. Such subsequent passes may be performed to repair a weld bead formed by a previous pass, for example, or may include a heat pass and one or more gap closing passes after a root pass as is done in pipe welding. In accordance with various embodiments, base and weld bead material can be simulated to include mild steel, stainless steel, and aluminum. For example, the mock welding unicoupon can be depicted in virtual reality space to appear as mild steel, stainless steel or aluminum, and characteristics of the virtual weld puddle (e.g., heating or cooling) can be controlled accordingly.

The mock welding unicoupon exists in the real world as, for example, a plastic part, and also exists in virtual reality space (i.e., in the interactive virtual reality welding environment) as a virtual welding unicoupon. Within the programmable processor based subsystem 12, the simulated surfaces of the virtual welding unicoupon that correspond to the actual surfaces of the mock welding unicoupon are broken up into a grid or array of welding elements, termed "wexels" forming a wexel map. Each wexel defines a small portion of the surface of the mock welding unicoupon. The wexel map defines the surface resolution. Changeable channel parameter values are assigned to each wexel, allowing values of each wexel to dynamically change in real-time in the interactive virtual reality welding environment during simulated welding. The changeable channel parameter values correspond to the channels Puddle (molten metal fluidity/viscosity displacement), Heat (heat absorption/dissipation), Displacement (solid displacement), and Extra (various extra states, e.g., slag, grain, scorching, virgin metal). These changeable channels can be referred to as PHED for Puddle, Heat, Extra, and Displacement, respectively.

The Puddle channel stores a displacement value for any liquefied metal at the wexel location. The Displacement channel stores a displacement value for the solidified metal at the wexel location. The Heat channel stores a value giving the magnitude of heat at the wexel location. In this way, the weldable part of the unicoupon can show displacement due to a welded bead, a shimmering surface "puddle" due to liquid metal, color due to heat, etc.

A displacement map and a particle system can be used wherein the particles can interact with each other and collide with the displacement map. The particles are virtual dynamic fluid particles and provide the liquid behavior of the weld puddle but are not rendered directly (i.e., are not visually seen directly). Instead, only the particle effects on the displacement map are visually seen. Heat input to a wexel affects the movement of nearby particles. There are two types of displacement involved in simulating a welding puddle which include Puddle and Displacement. Puddle is "temporary" and only lasts as long as there are particles and heat present. Displacement is "permanent". Puddle displacement is the liquid metal of the weld which changes rapidly (e.g., shimmers) and can be thought of as being "on top" of the Displacement. The particles overlay a portion of a virtual surface displacement map (i.e., a wexel map). The Displacement represents the permanent solid metal including both the initial base metal and the weld bead that has solidified.

In accordance with an example embodiment, the simulated welding process in virtual reality space works as follows: Particles stream from an emitter (emitter of the simulated mock welding tool) in a thin cone. The particles make first contact with the surface of the mock welding unicoupon where the surface is defined by a wexel map. The particles interact with each other and the wexel map and build up in real-time. More heat is added the nearer a wexel is to the emitter. Heat is modeled in dependence on distance from the arc point and the amount of time that heat is input from the arc. Certain visuals (e.g., color, etc.) are driven by the heat. A weld puddle is drawn or rendered in virtual reality space for wexels having enough heat. Wherever it is hot enough, the wexel map liquefies, causing the Puddle displacement to "raise up" for those wexel locations. Puddle displacement is determined by sampling the "highest" particles at each wexel location. As the emitter moves on along the weld trajectory, the wexel locations left behind cool. Heat is removed from a wexel location at a particular rate. When a cooling threshold is reached, the wexel map solidifies. As such, the Puddle displacement is gradually converted to Displacement (i.e., a solidified bead). Displacement added is equivalent to Puddle removed such that the overall height does not change. Particle lifetimes are adjusted to persist until solidification is complete. Certain particle properties that can be modeled include attraction/repulsion, velocity (related to heat), dampening (related to heat dissipation), and direction (related to gravity).

Figure 17A:
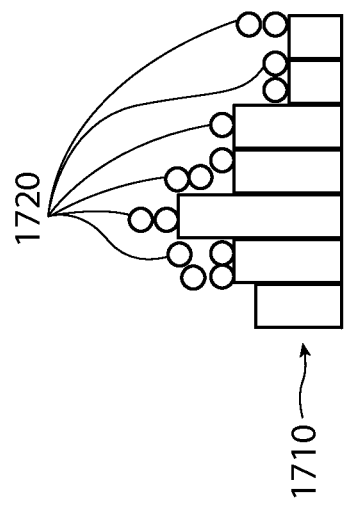
FIGS. 17A-C schematically illustrate example double displacement layers for simulating surfaces of a mock welding unicoupon in virtual reality space.
Figure 17B:
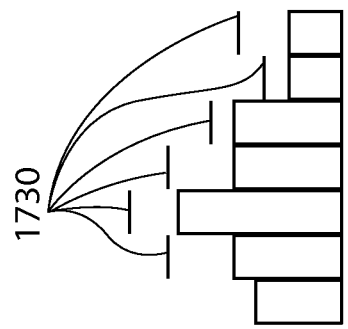
Figure 17C:
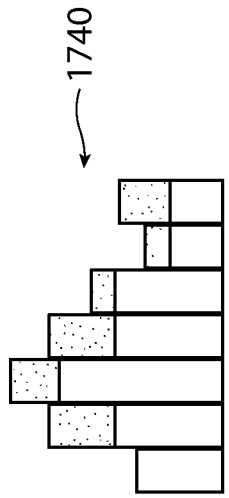

FIGS. 17a-17c illustrate an example embodiment of the concept of a dual or double displacement (displacement and particles) puddle model used by the virtual welding system. Mock welding unicoupons having a plurality of surfaces as described above are simulated in the virtual reality welding environment. The surfaces described above (e.g., grooved horizontal surface, grooved vertical surface, grooved curved surface, lapped surfaces, etc.) are simulated in the virtual reality welding environment as double displacement layers that have a solid displacement layer and a puddle displacement layer. The puddle displacement layer is capable of modifying the solid displacement layer.

As described herein, "puddle" is defined by an area of the wexel map where the Puddle value has been raised up by the presence of particles. The sampling process is represented in FIGS. 17a-17c. A section of a wexel map is shown having seven adjacent wexels. The current Displacement values are represented by un-shaded rectangular bars 1710 of a given height (i.e., a given displacement for each wexel). In FIG. 17a, the particles 1720 are shown as round un-shaded dots colliding with the current Displacement levels and are piled up. In FIG. 17b, the "highest" particle heights 1730 are sampled at each wexel location. In FIG. 17c, the shaded rectangles 1740 show how much Puddle has been added on top of the Displacement as a result of the particles. The weld puddle height is not instantly set to the sampled values since Puddle is added at a particular liquification rate based on Heat. Although not shown in FIGS. 17a-19c, it is possible to visualize the solidification process as the Puddle (shaded rectangles) gradually shrink and the Displacement (unshaded rectangles) gradually grow from below to exactly take the place of the Puddle. In this manner, real-time molten metal fluidity characteristics are accurately simulated. As a user practices a particular welding process, the user is able to observe the molten metal fluidity characteristics and the heat dissipation characteristics of the weld puddle in real-time in virtual reality space and use this information to adjust or maintain his welding technique.

The number of wexels representing the surface of a mock welding unicoupon is fixed. Furthermore, the puddle particles that are generated by the simulation to model fluidity are temporary, as described herein. Therefore, once an initial puddle is generated in virtual reality space during a simulated welding process, the number of wexels plus puddle particles tends to remain relatively constant. This is because the number of wexels that are being processed is fixed and the number of puddle particles that exist and are being processed during the welding process tend to remain relatively constant because puddle particles are being "created" and "destroyed" at a similar rate (i.e., the puddle particles are temporary). Therefore, the processing load of the programmable processor based subsystem remains relatively constant during a simulated welding session.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A mock welding unicoupon for a virtual welding system, comprising:
    a first exterior surface;
    a second exterior surface perpendicular to the first exterior surface, wherein the first exterior surface and the second exterior surface together provide a plurality of grooves configured for simulation of a plurality of different types of groove welds on the mock welding unicoupon;
    a curved exterior surface configured for simulation of a pipe fillet weld on the mock welding unicoupon; and
    a magnet source configured to generate a magnetic field around the mock welding unicoupon for tracking movements of a mock welding tool with respect to the mock welding unicoupon, wherein the magnet source is attached to the unicoupon in a fixed position.

2. The mock welding unicoupon of claim 1, wherein the magnet source is a base for the mock welding unicoupon, and supports the first and second exterior surfaces atop the base.

3. The mock welding unicoupon of claim 1, wherein the magnet source is attached to one or more exterior surfaces of the mock welding unicoupon.

4. The mock welding unicoupon of claim 1, wherein the plurality of grooves includes a vertical groove configured for simulation of a vertical groove weld, and a horizontal groove configured for simulation of a horizontal groove weld or a flat groove weld.

5. The mock welding unicoupon of claim 1, wherein the curved exterior surface includes a groove configured for simulation of a pipe groove weld.

6. The mock welding unicoupon of claim 5, wherein said and/or additional surfaces of the mock welding unicoupon are together configured for facilitating simulation of each of a vertical groove weld, a horizontal groove weld, a flat groove weld, a horizontal fillet weld, and a vertical fillet weld.

7. The mock welding unicoupon of claim 1, wherein said and/or additional surfaces of the mock welding unicoupon are together configured for facilitating simulation of each of a vertical groove weld, a flat groove weld, and an overhead fillet weld.

8. A virtual welding system, comprising:
a mock welding tool for performing simulated welds;
a mock welding unicoupon configured for receiving a plurality of different types of simulated welds using the mock welding tool, the mock welding unicoupon comprising at least one grooved surface and at least one curved surface, wherein the plurality of different types of simulated welds include:
a pipe fillet weld;
a groove weld; and
a linear fillet weld,
wherein the mock welding unicoupon has a plurality of holes configured for receiving simulated plug welds;
a programmable processor based subsystem operable to execute coded instructions for generating an interactive virtual reality welding environment that simulates welding activity on a virtual welding unicoupon corresponding to the mock welding unicoupon, wherein the interactive virtual reality welding environment includes a virtual weld puddle on the virtual welding unicoupon generated in real time in response to the simulated welds on the mock welding unicoupon; and
a display device operatively connected to the programmable processor based subsystem and configured to visually depict the interactive virtual reality welding environment, including the virtual weld puddle on the virtual welding unicoupon, in real time.

9. The virtual welding system of claim 8, wherein the mock welding unicoupon comprises a magnet source attached to the mock welding coupon and configured to generate a magnetic field around the mock welding unicoupon for tracking movements of the mock welding tool with respect to the mock welding unicoupon during simulated welding.

10. The virtual welding system of claim 9, wherein the magnet source is a base of the mock welding unicoupon configured for supporting said surfaces above the magnet source when the mock welding unicoupon is in use.

11. The virtual welding system of claim 8, wherein the mock welding unicoupon includes a tab configured for receiving both a simulated horizontal fillet weld and an overhead fillet weld.

12. The virtual welding system of claim 8, wherein the mock welding unicoupon is further configured for receiving a simulated lap weld.

13. The virtual welding system of claim 8, wherein the virtual weld puddle includes dynamic real time molten metal fluidity and heat dissipation characteristics that are displayed on the display device during simulated welding.

14. The virtual welding system of claim 13, wherein the at least one grooved vertical surface, the at least one grooved horizontal surface, and the at least one curved surface are respectively simulated in the interactive virtual reality welding environment as double displacement layers, wherein each double displacement layer includes a solid displacement layer and a puddle displacement layer, and wherein the puddle displacement layer is capable of modifying the solid displacement layer.

15. A virtual welding system, comprising:
a mock welding tool for performing simulated welds, wherein the mock welding tool comprises a magnetic field sensor;
a mock welding unicoupon configured for receiving a plurality of different types of simulated welds using the mock welding tool, the mock welding unicoupon comprising a magnet source configured to generate a magnetic field around the mock welding unicoupon for tracking movements of the mock welding tool with respect to the mock welding unicoupon, wherein the magnet source is attached to the unicoupon in a fixed position, and wherein the mock welding unicoupon further comprises at least one grooved vertical surface, at least one grooved horizontal surface, and at least one curved surface, wherein the plurality of different types of simulated welds include:
a pipe fillet weld;
a vertical groove weld;
a horizontal groove weld;
a flat groove weld;
a horizontal fillet weld; and
a pipe groove weld or an overhead fillet weld;
a programmable processor based subsystem operable to execute coded instructions for generating an interactive virtual reality welding environment that simulates welding activity on a virtual welding unicoupon corresponding to the mock welding unicoupon, wherein the interactive virtual reality welding environment includes a virtual weld puddle on the virtual welding unicoupon generated in real time in response to the simulated welds on the mock welding unicoupon, and wherein the virtual weld puddle includes dynamic real time molten metal fluidity and heat dissipation characteristics; and
a display device operatively connected to the programmable processor based subsystem and configured to visually depict the interactive virtual reality welding environment, including the virtual weld puddle on the virtual welding unicoupon, in real time.

16. The virtual welding system of claim 15, wherein the magnet source is a base of the mock welding unicoupon configured for supporting said surfaces above the magnet source when the mock welding unicoupon is in use.

17. The virtual welding system of claim 15, wherein the mock welding unicoupon is further configured for receiving a simulated vertical fillet weld.

18. The virtual welding system of claim 15, wherein the at least one grooved vertical surface, the at least one grooved horizontal surface, and the at least one curved surface are respectively simulated in the interactive virtual reality welding environment as double displacement layers, wherein each double displacement layer includes a solid displacement layer and a puddle displacement layer, and wherein the puddle displacement layer is capable of modifying the solid displacement layer.

19. The virtual welding system of claim 15, wherein the dynamic real time molten metal fluidity and heat dissipation characteristics are displayed on the display device during simulated welding.

* * * * *